R. E. SHAW.
MACHINE FOR CATCHING BOLL WEEVIL COTTON SQUARES.
APPLICATION FILED SEPT. 27, 1913.
1,091,970.
Patented Mar. 31, 1914.
2 SHEETS—SHEET 2.
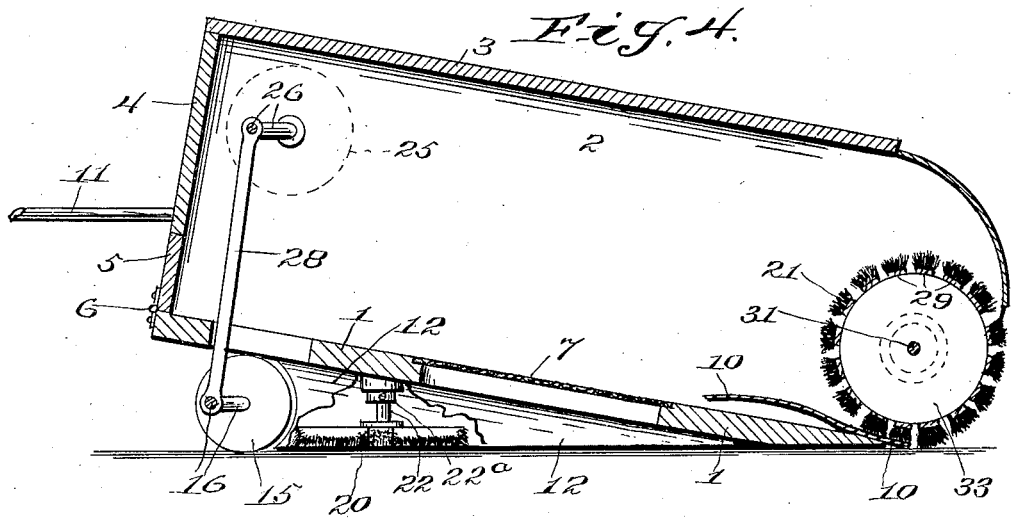
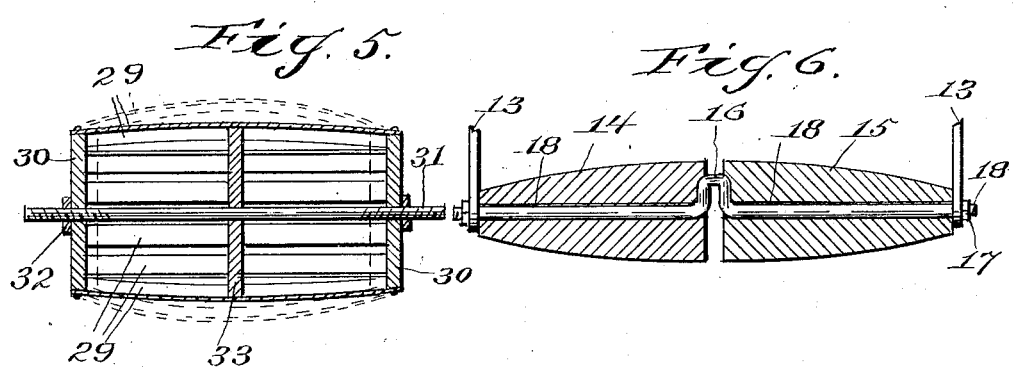
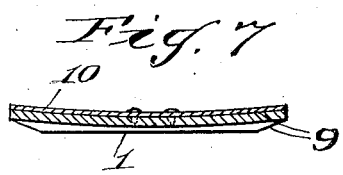
Witnesses:
R. F. Lansdale
W. F. Crossman
Inventor.
Robert E. Shaw
By C. F. Belt
Attorney.

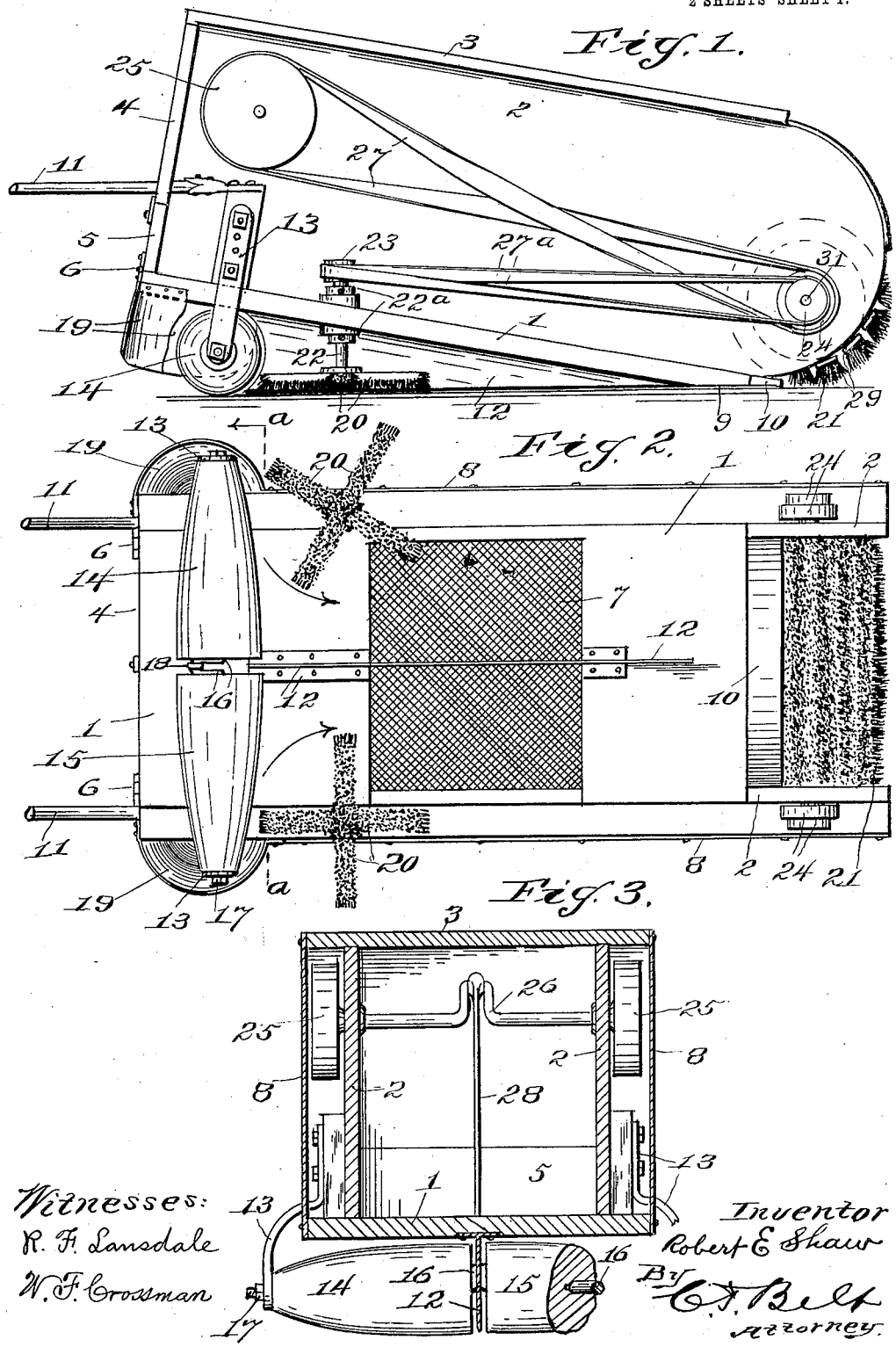

UNITED STATES PATENT OFFICE.

ROBERT E. SHAW, OF WHATLEY, ALABAMA.

MACHINE FOR CATCHING BOLL-WEEVIL COTTON-SQUARES.

1,091,970.  Specification of Letters Patent.  Patented Mar. 31, 1914.

Application filed September 27, 1913. Serial No. 792,127.

*To all whom it may concern:*

Be it known that I, ROBERT E. SHAW, a citizen of the United States, residing at Whatley, in the county of Clarke and State of Alabama, have invented certain new and useful Improvements in Machines for Catching Boll-Weevil Cotton-Squares, of which the following is a specification.

This invention relates to machines for collecting boll weevil, and pertains especially to a machine for collecting cotton "squares" containing boll weevil eggs.

The object of the invention is to provide a one horse drag or cart of simple and inexpensive construction having novel and peculiar means for collecting cotton "squares" by the coöperation of rotary brushes.

A further object of the invention is to provide a special traction roller, a plurality of coöperating brushes, and means connecting the roller with the brushes for operating the brushes.

A still further object of the invention is to provide a drag-catcher for boll weevil "squares" having a forward traction roller for operating a rotary brush and a pair of laterally revolving brushes located between the rotary brush and said roller, and to furnish certain novel and peculiar construction and arrangement of parts as will afford perfect operation in gathering boll weevil "squares" from the cotton rows and hills during the travel of the cart between the cotton rows.

Various other objects and improved results will be attainable in the practical application of the invention as will be hereinafter pointed out in the specification to follow.

In the accompanying drawings forming part of this application, Figure 1 is a side elevation with the side casing removed. Fig. 2 is a bottom plan view. Fig. 3 is a cross section taken on the dotted line *a—a*, Fig. 2, with the guards removed. Fig. 4 is a longitudinal sectional view. Fig. 5 is a longitudinal section of an adjustable brush frame the dotted lines showing the adjustment. Fig. 6 is a longitudinal section of the roller. Fig. 7 is a detail cross section of the rear end of the bed and the apron.

The same reference characters denote the same parts throughout the several views of the drawings.

For the purpose of carrying out my invention I employ a body comprising a bottom or bed 1, sides 2, top 3, and front 4, having a drop-door 5, hinged at 6. The bottom or bed 1 has a screen section 7 for discharging dirt, sand or similar matter from the body. The bed, the front, and the top project beyond the sides 2, for the purpose of forming a space between the sides and the side casing 8. The rear end of the bed is beveled, and concaved at 9, and said end is provided with a drag-apron 10 adapted to be bent to conform with the ground surface between the cotton rows. The front of the machine is provided with thills or shafts 11. The under side of the bed 1 is provided with a central longitudinal runner 12, the functions of which will hereinafter be described.

A traction roller is located in front of the runner by means of vertically adjustable hangers 13, for varying the height of the front of the cart or body. The roller is composed of two parts 14 and 15 which are secured on a crank-shaft 16, by nuts 17 so that such parts may be removed and other parts, differing in surface shape, substituted to suit the shape of the ground surface between the cotton rows. The crank shaft has a key 18 fitting a key-way in the roller parts to prevent said parts from turning on the shaft, and the adjacent ends of said parts have a groove in which the crank-member of said shaft fits when the said roller parts are slid into position. The roller projects beyond the side edges of the bed so as to reach across from one row of cotton to another, and in order to prevent the roller and the roller hangers from injuring the cotton plants or growth I provide the front corners of the carts with fenders 19 which extend around the ends of the roller. The roller forms a support for the front of the machine, and also closes the space between the ground and the front end of the bed 1 adjacent to the forward end of the runner 12, so as to preclude the forward passage of "squares" brushed by the side brushes.

A pair of side brushes 20 are employed for sweeping and fanning the "squares" inwardly and rearwardly. These brushes are located just behind the roller and project beyond the sides of the cart a sufficient distance to reach the cotton plants and hills for brushing the "squares" therefrom and toward the runner and rearwardly to a rotary brush 21, mounted in the rear end of the cart. The brushes 20 are mounted so as to be revolved parallel with the surface of the ground, and the brush shafts 22 extend through the bed projections and are provided with collars 22ª in which the shafts 22 may be raised and lowered for adjusting the brushes vertically, and the shafts 22 have pulleys 23 secured thereto. The space between the sides 2 and the casing 8 is for the purpose of housing the pulleys 23 and 24, and pulleys 25 on the ends of a crank-shaft 26, and the driving belts 27 and 27ª. The crank-shaft 26 is connected with the crank-shaft 16 by a pitman 28, for operating the belts.

The frame for the brush 21, is composed of a series of flexible brush-holding strips 29, the ends of which are secured to heads 30, slidable on a shaft 31, having screw-ends for suitable nuts 32, and a disk 33 secured to the center of the shaft 31, to prevent the strips from being bowed inwardly. The shaft 31 is provided with pulleys 24. The object of this brush construction and arrangement is to permit the contour of the brushing surface to be changed from a deep to a shallow convexity according to the shape of the ground surface to be brushed.

It will be seen that the apron, the rear brush, and the side brushes may be adjusted, and the roller changed to suit the condition of the ground surface between the cotton rows, and that the pair of side brushes reach under the plant foliage to the plant stems so that the "squares" are swept and blown toward the runner and backwardly throughout the surface of the ground between the cotton rows. It will be observed that the side brushes revolve toward each other and that the rear brush revolves at right angles to the rotary movement of the side brushes.

I do not wish to be understood as limiting the invention to any particular size, and shape, nor to any special material for the various parts, but reserve to myself the right to make such changes and variations in the manufacture and practical application of the invention as will come within the scope of the appended claims.

Having thus described my invention what I claim as new and desire to secure by Letters Patent is:—

1. In a machine for catching boll weevil "squares" the combination with a body into which the "squares" are deposited, of a pair of side brushes rotatable horizontally under the bed of the body, a rear brush rotatable at right angles to the rotary movement of the side brushes, a ground runner separating the side brushes, and means for operating all of said brushes.

2. In a machine for catching boll weevil "squares" the combination with a body into which the "squares" are deposited, of a pair of side brushes rotatable horizontally under the bed of the body, a rear brush rotatable at right angles to the rotary movement of the side brushes, a brush frame comprising a shaft, a pair of heads slidable on the ends of the shaft, a plurality of flexible brush-strips secured to the heads and adapted to be bowed outwardly to various positions by adjusting the heads, and means for operating all of said brushes.

3. In a machine for catching boll weevil "squares" the combination with a body into which the "squares" are deposited, and having a screen-bed portion, of a rotary brush for depositing the "squares" upon the screen, a flexible apron secured to the rear end of the bed and under the brush, a ground roller under the front end of the bed, a brush depending from the bed at each side thereof and rotatable horizontally, and means for operating all the brushes.

In witness whereof I hereunto set my hand in the presence of two witnesses.

ROBERT E. SHAW, M. D.

Witnesses:
SAM. H. GWIN,
M. A. RODGERS.